Sept. 22, 1964 F. H. BARGETZI 3,150,357
MAGNETIC TRANSDUCER
Filed Jan. 31, 1962
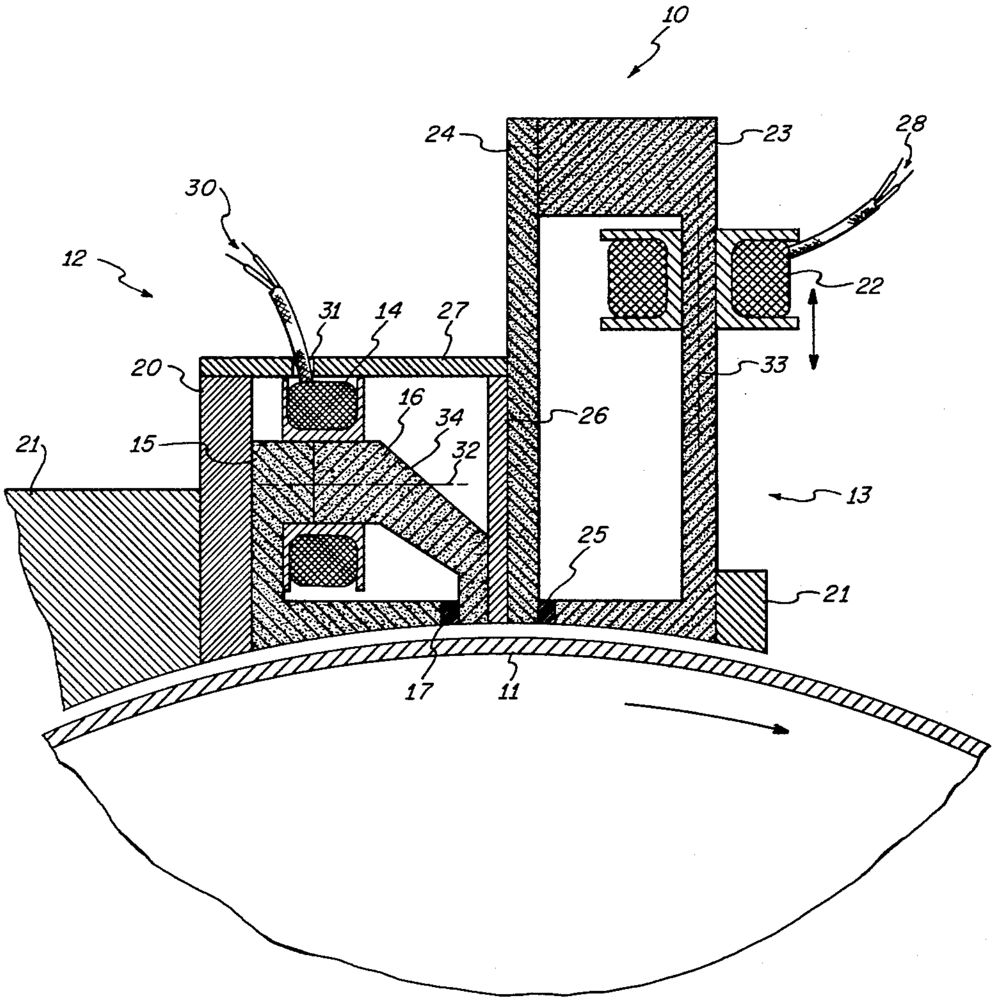
INVENTOR.
FRED H. BARGETZI
BY
[signature]
ATTORNEY 3,150,357

MAGNETIC TRANSDUCER

Fred H. Bargetzi, Huntington, N.Y., assignor to Sperry Rand Corporation, Great Neck, N.Y., a corporation of Delaware Filed Jan. 31, 1962, Ser. No. 170,027
2 Claims. (Cl. 340—174.1)

This invention relates to magnetic transducers of the type used for example in digital computers.

In order to improve the access time of a magnetic drum memory, recirculating loops are often used. A recirculating loop consists of a write head and a read head mounted on a single track at some fixed distance from one another. The distance is a function of the desired access time, the speed of rotation of the drum and the recording frequency. As the recording frequencies increase and the required access time decreases, the distance between the write head and the read head becomes smaller. With this smaller distance an electrical interaction between the two heads becomes more noticeable and when the distance is reduced to that required for a one word loop particularly on a high performance drum, the interaction has previously prevented satisfactory operation of these loops.

It is a primary object of the present invention to provide a magnetic transducer in which the interaction between heads is appreciably reduced in order that operation of short loops is possible.

It is another object of the present invention to provide a magnetic transducer having a high signal to noise ratio and a small gap to gap distance.

The above objects are achieved by the present invention by providing a magnetic transducer so constructed and arranged that (*a*) the axis of symmetry of the read head coil is oriented perpendicular to the axis of symmetry of the write head coil, (*b*) a copper eddy current shield is interposed between the two heads, (*c*) the write head core is bevelled to increase the reluctance of the magnetic paths linking the two heads, (*d*) the read head core is elongated to increase the reluctance of the magnetic path through the core material threading the two coils, and (*e*) the position of the read head coil is adjustable for optimum signal to noise performance.

The drawing is an elevational view of a magnetic transducer constructed in accordance with the present invention.

Referring to the drawing, a magnetic transducer 10 is shown cooperative with a magnetic memory drum 11. The magnetic transducer 10 utilizes improved write and read head assemblies 12 and 13 respectively which permit the incorporation of very short recirculating loops. A short recirculating loop is defined as one whose minimum head to head spacing is limited essentially by the physical size of the write and read heads. The write head assembly 12 includes a write head coil 14 mounted on ferrites 15 and 16. The ferrites 15 and 16 form a core section. The ferrites 15 and 16 have a dielectric gap spacer 17 clamped therebetween and cooperative with the drum 11. The write head assembly 12 is disposed within a write head housing 20 which in turn is mounted on a support member 21.

The read head assembly 13 includes a read head coil 22 mounted on ferrites 23 and 24. The output leads 28 of the coil 22 are connected to a conventional read amplifier not shown. The ferrites 23 and 24 form a core section. The ferrites 23 and 24 have a dielectric gap spacer 25 clamped therebetween and cooperative with the drum 11.

A copper eddy current shield 26 is disposed between the ferrites 16 and 24 to isolate the write head assembly 12 from the read head assembly 13. The lower extremity of the copper shield 26 is flush with the lower extremities of the core sections which in turn are arcuately shaped to match the drum radius and thus provide a smooth surface cooperative with the drum 11. The copper shield 26 extends to the top of the write head assembly 12. An aluminum cover 27 extends between the housing 20 and the shield 26 to cover the write head assembly 12. Signal input leads 30 to the coil 14 extend through an opening 31 in the cover 27. The leads 30 are connected to a conventional write head amplifier not shown. The entire magnetic transducer 10 is mounted in the support 21.

An important feature which reduces interaction between the write head assembly 12 and the read head assembly 13 is the arrangement of the write and read coils 14 and 22 respectively in which the coils 14 and 22 are disposed with their corresponding axes of symmetry 32 and 33 respectively oriented perpendicular with respect to each other. This prevents the lines of flux generated by the coil 14 from threading the coil 22 in a manner to be more fully explained. Interaction is further reduced by bevelling the surface 34 of the ferrite 16 which is adjacent the copper shield 26. In addition the ferrites 23 and 24 of the read head assembly 13 are made appreciably larger than the ferrites 15 and 16 of the write head assembly. Another feature of the present invention is that the read coil 22 is positionable in a vertical direction as viewed in the drawing on the ferrite 23. The coil 22 is vertically positioned until the optimum signal to noise ratio is obtained on its output leads 28 and it is then secured to the ferrite 23 in that position.

In digital computer operation when writing on the drum 11, a voltage is applied to one side or the other of a center tapped coil (not shown) depending upon whether it is desired to write a one or a zero. The current from the leads 30 goes through the write head coil 14 and generates lines of flux which are focussed by the ferrites 15 and 16 to a point just above the recording surface of the drum 11. This point is located at the gap of the read head assembly 12 defined by the spacer 17. At this point the lines of flux come out of the ferrites 15 and 16 and go through the recording medium on the drum 11 which is a low reluctance path since the permeability of the recording medium on the drum 11 is approximately four times as great as that of the surrounding air. The flux lines magnetize the drum surface to saturation thus storing the information on the drum 11. As the drum 11 rotates, the information is read by the ferrites 23 and 24 of the read head assembly 13 providing a lower reluctance path than the air for the recorded information flux lines to close on themselves. The path defined by the ferrites 23 and 24 guides the flux lines through the read coil 22 where they induce a signal voltage which is transmitted to the read amplifier (not shown) by the output leads 28.

The above description is ideally how the loop works; however, when the write voltage is applied to the write coil 14 stray lines of flux are generated. Any of the stray lines of flux that thread the read coil 22 induce therein a noise voltage. Since the output signal voltage from the read coil 22 is normally low (approximately 50 millivolts) due to the small number of flux lines generated by the recorded information on the drum 11, it is imperative to keep the noise to a minimum.

In the absence of the present invention, the signal to noise ratio of a magnetic transducer configuration having symmetrical write and read head assemblies with a mu metal shield was found to be 0.05:1. This unacceptable performance is attributed to the many flux paths that thread the read coil.

The present invention eliminates many of these undesirable flux paths by orienting the read coil 22 90° in space with respect to the write coil 14. By doing this any stray lines that travel a complete air path are prevented from threading the coil and thus inducing noise voltages. In addition the read coil 22 is adjustable. The read coil 22 is moved up or down while the write coil 14 is energized until a minimum induced noise voltage is observed on output leads 28 of the read coil 22. Further, a conductive (copper) shield 26 is used in lieu of a magnetic (mu metal) shield. This increases the reluctance of the flux paths between the two heads by inducing eddy currents in the copper shield 26. In addition, the size of the read head assembly B is made appreciably larger than the size of the write head assembly 12 thus providing a higher reluctance path for the flux lines tending to travel through the read head assembly 13. Utilizing the present invention, signal to noise ratios of 10 or better are realized.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A magnetic transducer having first and second signal translating assemblies, each of said assemblies defining a magnetic circuit, each of said assemblies including a plurality of core members forming a substantially rectangular core section having a gap therein, one of said core sections being substantially larger than the other, said core sections having their long dimensions perpendicular with respect to each other, means for electromagnetically isolating said magnetic circuits with respect to each other, said core sections being disposed adjacent each other and separated only by said isolating means thereby providing minimum gap spacing and access time, said isolating means comprising a strip of electrically conductive material, the smaller of said core sections having the core member adjacent said isolating means bevelled, and first and second coil means mounted on said first and second core sections respectively, said first and second coil means being oriented with their corresponding axes of symmetry perpendicular with respect to each other at least one of said coil means is positionably disposed with respect to its core section whereby the combination cooperates to provide minimum interaction between assemblies and minimum access time.

2. A magnetic transducer having a write head assembly and a read head assembly, each of said assemblies defining a magnetic circuit, each of said assemblies including a plurality of core members forming a substantially rectangular core section having a gap therein, the read core section being substantially larger than the write core section, said core sections having their long dimensions perpendicular with respect to each other, means for electromagnetically isolating said magnetic circuits with respect to each other, said core sections being disposed adjacent each other and separated only by said isolating means thereby providing minimum gap spacing and access time, said isolating means comprising a shield of electrically conductive material, the write core section having the core member adjacent said isolating means bevelled, write coil means mounted on said write core section, read coil means mounted on said read core section, said write and read coil means being oriented with their corresponding axes of symmetry perpendicular with respect to each other whereby the combination cooperates to provide minimum interaction between assemblies and minimum access time.

References Cited in the file of this patent

UNITED STATES PATENTS 2,668,878 Munroe ---------------- Feb. 9, 1954